(12) United States Patent
Tang et al.

(10) Patent No.: US 10,324,959 B2
(45) Date of Patent: Jun. 18, 2019

(54) GARBAGE COLLECTION IN STORAGE SYSTEM

(71) Applicant: Futurewei Technologies, Inc., Plano, TX (US)

(72) Inventors: Xiangyu Tang, Santa Clara, CA (US); Yunxiang Wu, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 288 days.

(21) Appl. No.: 15/271,012

(22) Filed: Sep. 20, 2016

(65) Prior Publication Data

US 2018/0081587 A1 Mar. 22, 2018

(51) Int. Cl.
| | | |
|---|---|---|
| G06F 16/28 | (2019.01) | |
| G06F 3/06 | (2006.01) | |
| G06F 16/178 | (2019.01) | |
| G06F 16/33 | (2019.01) | |
| G06F 12/02 | (2006.01) | |

(52) U.S. Cl.
CPC ........... G06F 16/285 (2019.01); G06F 3/064 (2013.01); G06F 3/0608 (2013.01); G06F 3/0652 (2013.01); G06F 3/0679 (2013.01); G06F 12/0246 (2013.01); G06F 16/1787 (2019.01); G06F 16/334 (2019.01)

(58) Field of Classification Search
CPC ...... G06F 3/0652; G06F 3/064; G06F 3/0608; G06F 3/0679; G06F 12/0246; G06F 16/285; G06F 16/334; G06F 16/1787; G06F 16/9566; G06F 16/9017

USPC ........................................................ 707/741
See application file for complete search history.

(56) References Cited

U.S. PATENT DOCUMENTS

| | | | | |
|---|---|---|---|---|
| 7,085,789 | B1 * | 8/2006 | Tarditi | G06F 12/0253 707/702 |
| 7,584,231 | B1 * | 9/2009 | Daynes | G06F 12/0269 707/806 |
| 7,685,185 | B2 * | 3/2010 | Ramasubramanian | G06F 16/1787 707/638 |
| 8,463,826 | B2 * | 6/2013 | Post | G06F 12/0246 707/820 |
| 8,650,538 | B2 * | 2/2014 | Gounares | G06F 8/311 717/114 |
| 8,751,542 | B2 * | 6/2014 | Mostafa | G06F 16/2237 707/803 |
| 9,645,922 | B2 * | 5/2017 | Ouyang | G06F 12/0246 |
| 2012/0239851 | A1 * | 9/2012 | Calvert | G06F 11/1441 711/103 |

(Continued)

*Primary Examiner* — Shahid Alam
(74) *Attorney, Agent, or Firm* — Jinghua Karen Tang (57) ABSTRACT

A storage device implements a method for garbage collection. The storage device arranges data blocks of a storage medium into a bin and determines first coldness of a first data block in the bin and second coldness of a second data block in the bin that are respectively associated with a first rate of change of valid data in the first data block into invalid data and a second rate of change of valid data in the second data block into invalid data. Based on the first coldness and the second coldness, the storage device selects a colder data block from the first and second data blocks as a garbage data block. Because the valid data in the selected garbage data block are more stable, they may cause less new stale data or garbage data in a new block to which the valid data are moved.

15 Claims, 6 Drawing Sheets

(56) References Cited

U.S. PATENT DOCUMENTS

| | | | |
|---|---|---|---|
| 2016/0124848 A1* | 5/2016 | Bellorado | G06F 12/0253 711/103 |
| 2016/0132429 A1* | 5/2016 | Lin | G06F 3/0619 707/814 |
| 2017/0220623 A1* | 8/2017 | Blount | G06F 12/0269 |

* cited by examiner

GARBAGE COLLECTION IN STORAGE SYSTEM

BACKGROUND

A flash storage device usually contains a flash controller and at least one flash chip. One limitation of the flash chip is that, although it can be read or programmed a byte or a word at a time in a random access fashion, the data stored in the flash chip can be erased only a block at a time. If the data in a data block of the flash chip need to be updated or replaced by new replacement data, rather than directly delete the data from the data block, the chip controller will mark the data to be replaced as "stale" and program the new replacement data into the same data block. When the data block is fully programmed, a garbage collection operation may be performed to the data block. For example, during the garbage collection operation, the data in the data block that are marked as "stale" may be deleted and the other data that are not marked as "stale" may be copied to another data block. After the garbage collection operation, the data block is empty, ready to store new data. When a plurality of data blocks inside a flash chip are full, the chip controller may select the data block with the least valid data from the plurality of data blocks as a garbage block and perform the garbage collection operation on the data block that has been marked as the garbage block.

SUMMARY

In one embodiment, the disclosure includes a storage device comprising: a non-transitory memory comprising instructions; and a processor in communications with the memory, where the processor is configured to execute the instructions to: arrange data blocks of a storage medium into a sequence of bins, where each bin includes a plurality of data blocks, where the sequence of bins comprises a first bin and a second bin, where a first bin ratio of the first bin is lower than a second bin ratio of the second bin, and where a bin ratio of a bin is calculated as a ratio of valid data in the bin over the sum of valid and invalid data in the bin; choose a first data block and a second data block in the first bin based on a first block ratio of the first data block and a second block ratio of the second data block, where a block ratio of a data block is calculated as a ratio of valid data in the data block over the sum of valid and invalid data in the data block, and where the first block ratio and the second block ratio are each smaller than the second bin ratio; select, between the first and the second data blocks, the data block with a lower rate of change of valid data into invalid data in the data block as a garbage block; copy valid data from the selected data block into another data block; and delete data in the selected data block. In this embodiment, the storage device selects a more stable or colder data block between or among data blocks having comparatively less valid data as the garbage data block to remove. The more stable or colder data block has lower rate or speed of changing from valid data into invalid data. Because the valid data removed to a new block are more stable or colder, the removed valid data may cause less new stale data or garbage data in the new block than some other valid data, therefore saving space of storage medium.

In one embodiment, the disclosure includes a storage device comprising: a non-transitory memory comprising instructions; and a processor in communications with the memory, where the processor is configured to execute the instructions to: arrange data blocks of a storage medium into a sequence of bins, where each bin includes a plurality of data blocks, where the sequence of bins comprises a first bin and a second bin, and where a first bin ratio of the first bin is lower than a second bin ratio of the second bin, and where a bin ratio of a bin is calculated as a ratio of valid data in the bin over the sum of valid and invalid data in the bin; choose a first data block and a second data block in the first bin based on a first block ratio of the first data block and a second block ratio of the second data block, where a block ratio of a data block is calculated as a ratio of valid data in the data block over the sum of valid and invalid data in the data block, and where the first block ratio and the second block ratio are each smaller than the second bin ratio; predict a first value and a second value, where the first value is a first quantity of data in the first data block that changes from valid data into invalid data during a time period between a first time and a second time, where the second value is a second quantity of data in the second data block that changes from valid data into invalid data in the time period; select, based on the first value and the second value, the first or the second data block; copy valid data from the selected data block into another data block; and delete data in the selected data block. In this embodiment, the first value is predicted based on the size of invalid data in the first data block at the first time, the first time, the second time and a first data life time span value of the first data block at the first time, where the second value is predicted based on a size of invalid data in second data block at the first time, the first time, the second time and a second data life time span value of the second data block at the first time.

In one embodiment, the disclosure includes a storage device comprising: a non-transitory memory comprising instructions; and a processor in communications with the memory, where the processor is configured to execute the instructions to: arrange data blocks of a storage medium into a sequence of bins, where each bin includes a plurality of data blocks, where the sequence of bins comprises a first bin and a second bin, where a first bin ratio of the first bin is lower than a second bin ratio of the second bin, and where a bin ratio of a bin is calculated as a ratio of valid data in the bin over the sum of valid and invalid data in the bin; choose a first data block and a second data block in the first bin based on a first block ratio of the first data block and a second block ratio of the second data block, where a block ratio of a data block is calculated as a ratio of valid data in the data block over the sum of valid and invalid data in the data block, and where the first block ratio and the second block ratio are each smaller than the second bin ratio; select, based on data life time span values of the first data block and the second data block, a garbage data block; copy the valid data from the selected data block into another data block; and delete data in the selected data block.

In one embodiment, the disclosure includes a method for garbage collection in a storage medium, comprising: arranging data blocks of the storage medium into a bin; determining first coldness of a first data block in the bin and second coldness of a second data block in the bin that are respectively associated with a first rate of change of valid data in the first data block into invalid data and a second rate of change of valid data in the second data block into invalid data; selecting, based on the first coldness and the second coldness, a colder data block from the first and second data blocks; copying valid data from the colder data block to another data block; and deleting data in the colder data block.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Figure 1:
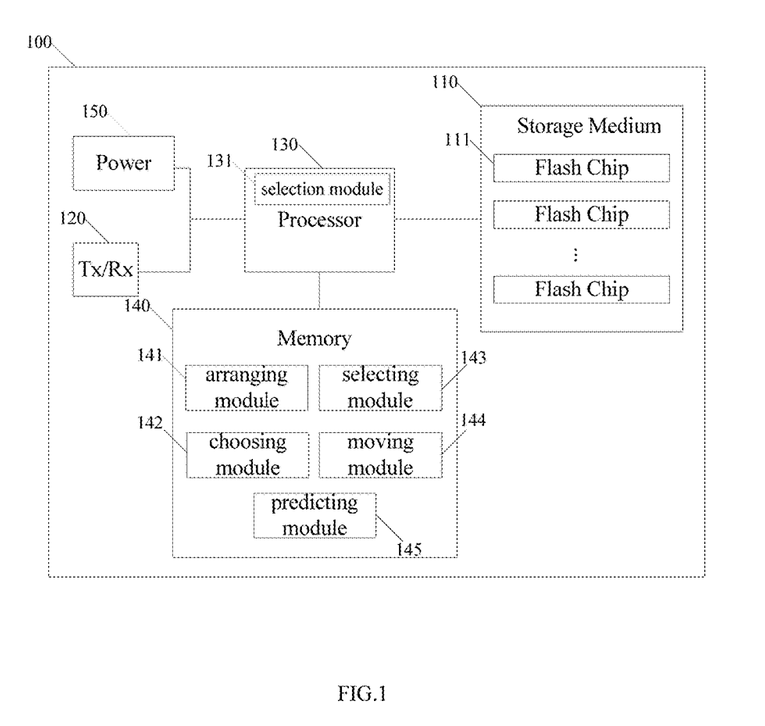
FIG. 1 is a schematic diagram of a storage device according to an embodiment of the disclosure.

FIG. 1 is a schematic diagram of a storage device 100 according to an embodiment of the disclosure. The storage device 100 may encompass a broad range of devices having a storage medium 110. For example, the storage device 100 may be a solid-state drive (SSD), personal computer, laptop, tablet, smart potable device or mobile phone. The storage medium 110 in the storage device 100 may include a plurality of flash chips 111, a hard disk (not shown in FIG. 1), or both the flash chips 111 and the hard disk. The flash chips 111 may be named as flash memories or flash memory chips. Particularly, the flash chips may be NOT-AND (NAND) flash chips. The hard disk may be named as hard drive or hard disk drive. Particularly, the hard disk may include an actuator, a read/write actuator arm, a read/write head, a spindle and a platter. In some embodiments, the flash chips 111 and/or the hard disk may be used to storage long-term data because when power supply to the flash chips terminates, data stored in the flash chips and the hard disk will not be erased.

Besides the storage medium 110, the storage device 100 may further include transceivers (Tx/Rx) 120, a processor 130, a memory 140 and a power supply 150. The transceivers 120 may be physical transmitters, receivers, or combinations thereof, to communicate with one or more other devices. In some embodiments, the transceivers 120 may include a network interface circuit, such as a network interface card (NIC), used to couple with a network wire or network cable. In some embodiments, the transceivers 120 may include an antenna. With the transceivers 120, the storage device 100 may transmit and receive messages, packages and/instructions to/from another device. The processor 130 may be coupled to the transceivers 120 via a bus or a dedicated connection. The transceivers 120 may transmit information received from a device located outside the storage device 100 to the processor 130, and transmit information received by the processor 130 to a device located outside the storage device 100. The memory 140 may be used to temporarily store content or store short-term data. The memory 140 may be a random access memory (RAM), such as a dynamic RAM (DRAM) or a static RAM (SRAM). In some embodiments, the speed of reading data from the memory 140 by the processor 130 may be higher than the speed of reading data from the storage medium 110. Before the processor 130 performs the instructions stored in storage medium 110, the processor 130 may read the instructions from a firmware of the storage medium 110 into the memory 140 and then read the instructions from the memory 140. In some embodiments, the processor 130 may directly read the instructions from the storage medium 110 to perform the instructions.

The processor 130 may include one or more multi-core processors. The processor 130 may be implemented as a general processor or may be part of one or more application specific integrated circuits (ASICs) and/or digital signal processors (DSPs). The processor 130 may include a garbage selection module 131. In some embodiments, the garbage selection module 131 may be a physical integrated circuit used for collecting garbage data according to a logic configured in the integrated circuit or according to instructions stored in the memory 140 or storage medium 110. In one embodiment, the instructions may include an arranging module 141, a choosing module 142, a selecting module 143 or a moving module 144. The arranging module 141 may be configured to be executed by the processor 130 to implement the operation of arranging data blocks of a storage medium into a sequence of bins, where the storage medium may refer to the storage medium 110 in the storage device or a storage medium in another device communicatively coupled with the storage device 100. The plurality of bins may be in one flash chip 111 or may be in two or more flash chips 111. The choosing module 142 may be configured to be executed by the processor 130 to implement the operation of choosing a first data block and a second data block in a first bin of the sequence of the bins in the storage medium. The selecting module 143 may be configured to be executed by the processor 130 to implement operation of selecting, between the first and second data blocks, a data block as garbage data block. In some embodiments, the selected garbage data block may have a lower rate of change of valid data into invalid data. In some embodiments, it is predicted that the selected garbage data block may generate less invalid data in a future time period. In some embodiments, the life time span value of the selected garbage data block may be longer. The moving module 144 is configured to be executed by the processor 130 to implement the operation of copying the valid data from the selected data block into another data block and deleting the data in the selected data block. In some embodiments, the instructions may further include a prediction module 145 that is configured to be executed by the processor to predict the quantity of invalid data generated in a data block in a future time period. In some embodiments, the predicted quantity may be used by selecting module 143 to select a garbage data block. The quantity of data may refer to a size of the data. For example, the unit of quantity of data may be measured in megabyte or byte. The power supply 150 is used to provide electricity to the storage device 100. In some embodiments, the power supply 150 may be a physical circuit to stabilize or modify the voltage of incoming electricity. In some embodiments, the power supply 150 may transform alternating current into direct current.

It is understood that by programming and/or loading executable instructions onto the storage device 100, at least one of the processor 130 and/or memory 140 are changed, transforming the storage device 100 in part into a particular machine or apparatus having the novel functionality taught by the present disclosure.

Figure 2:
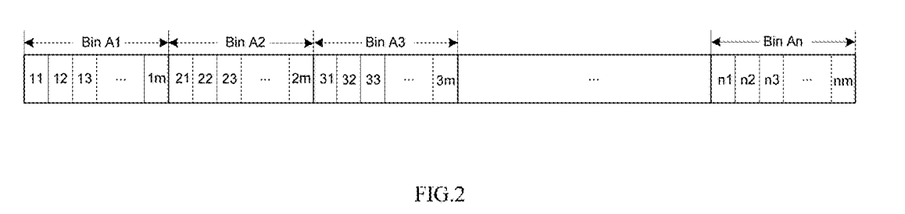
FIG. 2 is a schematic diagram illustrating a sequence of bins according to an embodiment of the disclosure.

FIG. 2 is a schematic diagram illustrating a sequence of bins according to an embodiment of the disclosure. The garbage collection of the disclosure may refer to selecting a garbage data block from the sequence of bins. As shown in FIG. 2, the sequence of n bins may include bins A1, A2, A3 . . . An. Each bin may include a plurality of data blocks. For example, the quantity of the data blocks of each bin may be m. Therefore, bin A1 may include data blocks 11, 12 . . . 1m, bin A2 may include data blocks 21, 22 . . . 2m, . . . bin An may include data blocks n1, n2 . . . nm. Each data block may include valid data and invalid data. The size of each data blocks may be the same or different. Each bin is associated with a corresponding bin ratio. The bin ratio of a bin may be a ratio of valid data in the bin over a sum of valid and invalid data in the bin. In some embodiments, the bins in a flash chip are arranged according to the ascending order of their respective bin ratios. For example, the bin ratio of bin A1 may be lower than the bin ratio of bin A2 because bin A2 is neighboring to and sequentially follows bin A1. Similarly, the bin ratio of bin A2 may be lower than the bin ratio of bin A3, and the bin ratio of bin An−1 may be lower than the bin ratio of bin An.

In some embodiments, the quantities of data blocks in different bins may be different. For example, bin A1 may have m data blocks, bin A2 may have m+2 data blocks, and bin A3 may have m+4 or m−2 data blocks. Alternatively, the quantities of data blocks in different bins may be the same. In some embodiments, if the ratio of the quantity of data blocks in a bin over quantity of all data blocks in all the bins is less than a threshold value, the bin may not be determined as the first bin. For example, as shown in FIG. 2, for bin A1, the quantity of data blocks in bin A1 is m and there are total n bins in FIG. 2. Thus, the quantity of all data blocks in bin A1 to bin An is m×n. In such a situation, the ratio is m/(m×n)=1/n. The threshold value may be 3%, 5%, 10%, 15%, 20% or another value. In some embodiments, a data block may be referred as a block for convenience. In some embodiments, the first bin and the second bin may respectively refer to as bin A1 and bin A2, bin A1 and bin A3, bin A2 and A3, or A3 and A1 in FIG. 2.

Each block in the sequence as shown in FIG. 2 may be associated with a corresponding block ratio. The block ratio of a data block may be calculated as the ratio of the valid data in the data block over the sum of the valid data and the invalid data in the data block. In some embodiments, all data blocks in a bin may be sorted in an ascending order based on the block ratios of all data blocks in the bin. In other words, the block ratio of each data block in a bin may be lower than the block ratio of its neighboring data block that sequentially follows it. For example, the block ratio of data block 11 in FIG. 2 may be lower than the block ratio of data block 12, the block ratio of data block 12 may be lower than the block ratio of data block 13, . . . the block ratio of data block 1m−1 may be lower than the block ratio of data block 1m.

In some embodiments, all the data blocks in all bins are sorted in an ascending order of block ratios of all data blocks in all the bins. For example, the block ratio of data block 11 may be lower than the block ratio of data block 12, the block ratio of data block 12 may be lower than the block ratio of data block 13 . . . a block ratio of data block 1m−1 may be lower than the block ratio of data block 1m, the block ratio data block 1m may be lower than the block ratio of data block 21, the block ratio of data block 21 may be lower than the block ratio of data block 22 . . . the block ratio of data block 2m may be lower than the block ratio of data block 31.

In some embodiments, a block ratio of a data block may be higher than a block ratio of its neighboring block that sequentially follows the data block. For example, the block ratio of data block 11 may be higher than the block ratio of data block 12. In some embodiments, the block ratio of the data block in a bin may be higher than the bin ratio of a neighboring bin which sequentially follows the bin, or, higher than the block ratios of one or more blocks in a neighboring bin which sequentially follows the bin. For example, a block ratio of data block 1m may be higher than a bin ratio of bin A2, or higher than the block ratio of data block 22, which is in bin A2.

Figure 3:
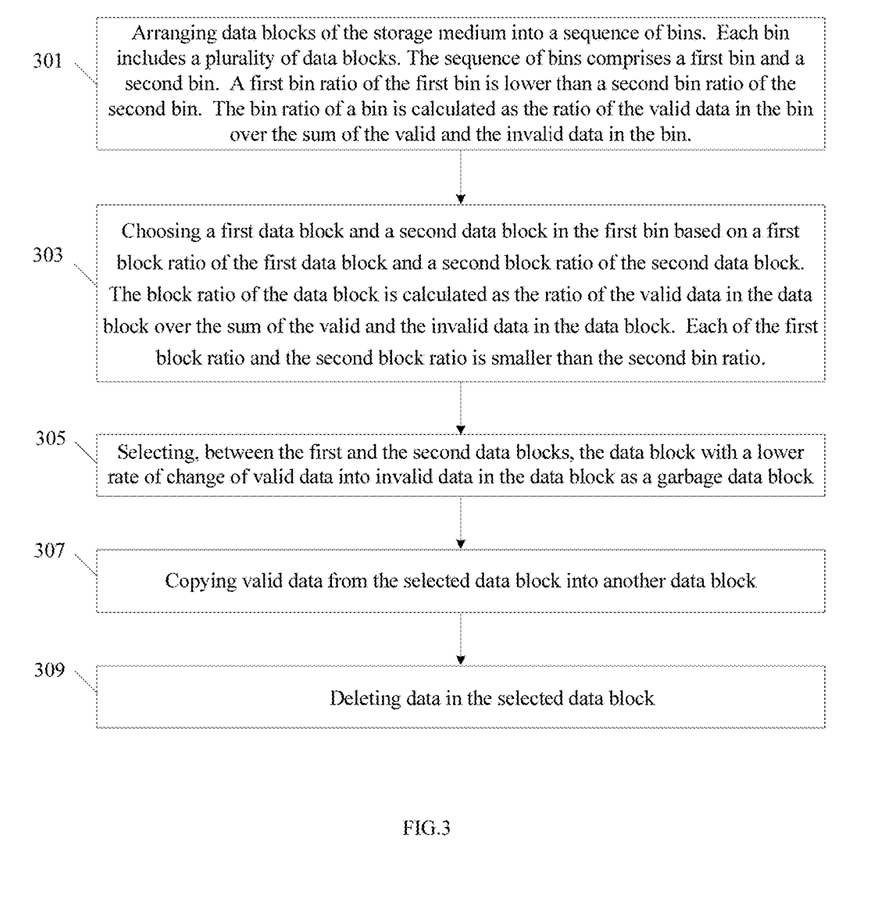
FIG. 3 is a flowchart illustrating a method for garbage collection according to an embodiment of the disclosure.

FIG. 3 is a flowchart illustrating a method for garbage collection according to an embodiment of the disclosure. The method may be implemented by the storage device 100 as illustrated in FIG. 1. The processor 130 in the storage device 100 may implement the operations in this embodiment according to computer readable instructions stored in memory 140. The instruction are stored in different modules in memory 140, such as arranging module 141, choosing module 142, selecting module 143, moving module 144 and predicting module 145.

At operation 301, the storage device 100 may arrange data blocks of the storage medium into a sequence of bins, where each bin includes a plurality of data blocks. The sequence of the bins may be arranged as the bins illustrated in FIG. 2. The sequence of bins may comprise a first bin and a second bin, where a first bin ratio of the first bin is lower than a second bin ratio of the second bin. In some embodiments, the storage medium may be the storage medium 110 as shown in FIG. 1. In some alternative embodiments, the storage medium may be located outside the storage device 100 and be communicatively coupled with the storage device 100. The bin ratio of a bin may be calculated as a ratio of valid data in the bin over a sum of the valid data and the invalid data in the bin. For example, the first bin ratio of the first bin may be calculated as a ratio of valid data in the first bin over the sum of valid and invalid data in the first bin, where invalid data may be referred to as stale data. Similarly, the second bin ratio of the second bin may be calculated as a ratio of valid data in the second bin over the sum of valid and invalid data in the second bin. For example, when the quantity of the valid data in the first bin is 100 megabyte (M), and the sum of the quantity of the valid data and the quantity of the invalid data in the first bin is 500M, then the first bin ratio of the first bin is 100M/500M=0.2 or 20%. In some embodiments, the sum of the quantity of the valid data and the quantity of the invalid data in a bin may be substantially equal to the size of the bin. In some embodiments, the first bin may be sequentially the first in the sequence of bins and the second bin is sequentially the second in the sequence of bins. For example, the first bin may be the bin A1 in FIG. 2, and the second bin may be the bin A2 in FIG. 2. In some embodiments, the first and second bins may be two sequentially random bins in the sequence of bins. For example, the first bin may be the bin A2 and the second bin may be the bin A4 in FIG. 2. In some embodiments, the first bin ratio may have the lowest bin ratio among the bin ratios for all of the bins, and the second bin ratio may have the second lowest bin ratio among the bin ratios for all of the bins.

At operation 303, the storage device 100 may choose a first data block and a second data block in the first bin based on a first block ratio of the first data block and a second block ratio of the second data block. Each of the first block ratio and the second block ratio may be smaller than the second bin ratio. In some embodiments, the first block ratio of the first data block may be calculated as the ratio of valid data in the first data block over the sum of the valid data and the invalid data in the first data block. The second block ratio of the second data block may be calculated as the ratio of the valid data in the second data block over the sum of the valid data and the invalid data in the second data block.

In some embodiments, the first block ratio may have the lowest block ratio among the block ratios for all of the data blocks in the first bin, and the second block ratio may have the second lowest block ratio among the block ratios for all of the data blocks in the first bin. In some embodiments, the first block ratio may have the lowest block ratio among the block ratios for all of the data blocks in all the bins in the sequence; and the second block ratio may have the second lowest block ratio among the block ratios for all of the data blocks in all of the bins in the sequence. In such situations, because each of the first data block and the second data block has less valid data than other data blocks, these two data blocks may be the candidates of the garbage data block.

At operation 305, the storage device 100 may select a garbage data block from the first and the second data blocks. The selected garbage data block has a lower rate of change of valid data into invalid data.

A rate of change of valid data into invalid data in a data block is based on two elements. One of the two elements is the data life span value of the data block at a time. The other is the size of invalid data in the data block at the time. For example, a first rate of change of valid data into invalid data in the first data block may be based on two elements. One of the two elements is the first data life span value of the first data block at a first time. The other of the two elements is the size of invalid data in the first data block at the first time. Similarly, a second rate of change of valid data into invalid data in the second data block may be based on two elements. One of the two elements is a second data life span value of the second data block at the first time. The other of the two elements is a size of invalid data in the second data block at the first time. For example, when the data life span value of a data block at a time T1 500 second (s), and the size of invalid data in the data block is 5M at the time T1, then the rate of change of the valid data into the invalid data in the data block may be 5M/500 s=1M/100 s. Based on the values of the first rate of change and the second rate of change, the storage device may select the one with the lower rate between the first rate of change and the second rate of change. For example, when the first rate of change is 1M/100 s and the second rate of change is 1.2M/100 s, the first data block may be selected as a garbage data block. A data block with a lower rate of change of valid data into invalid data may indicate that the stale data in the data block increases more slowly and the valid data in the data block is more stable or colder.

In some embodiments, the selection of the data block with the lower rate of change of valid data into invalid data in the data block is among three or more data blocks. For example, the storage device 100 may choose one or more data blocks besides the first and second data blocks at operation 303, where each of the block ratios of the one or more data blocks is smaller than the second bin ratio. At operation 305, the storage device 100 may determine the rates of change of valid data into invalid data for the one or more blocks and select a data block, e.g. block 11 in FIG. 2, as the garbage data block based on the rates of change of valid data into invalid data in the first, second and the one or more data blocks.

At operation 307, the storage device 100 may copy valid data from the selected data block into another data block. For example, when the first data block (block 11 in FIG. 2) of the first data block (block 11) and the second data block (block 12 in FIG. 2) is selected, the storage device may copy valid data in block 11 into another block, such as block 13, 1m, 23, or n2. Another block and the first data block may be in the same flash chip or different flash chips in FIG. 2.

At operation 309, the storage device 100 may delete the data in the selected data block. Because the valid data in the selected data block is already copied into another data block, the valid data in the selected block may be deleted to make the selected block to be available to store new data. In order to get more available space, the storage device may delete all the data in the selected data block.

According to above method of some embodiments of the disclosure, the storage device selects a more stable or colder data block between or among data blocks having comparatively less valid data as the garbage data block to remove. The more stable or colder data block has lower rate or speed of changing from valid data into invalid data. Because the valid data removed to a new block are more stable or colder, the removed valid data may cause less new stale data or garbage data in the new block than some other valid data, therefore saving space of storage medium.

Figure 4:
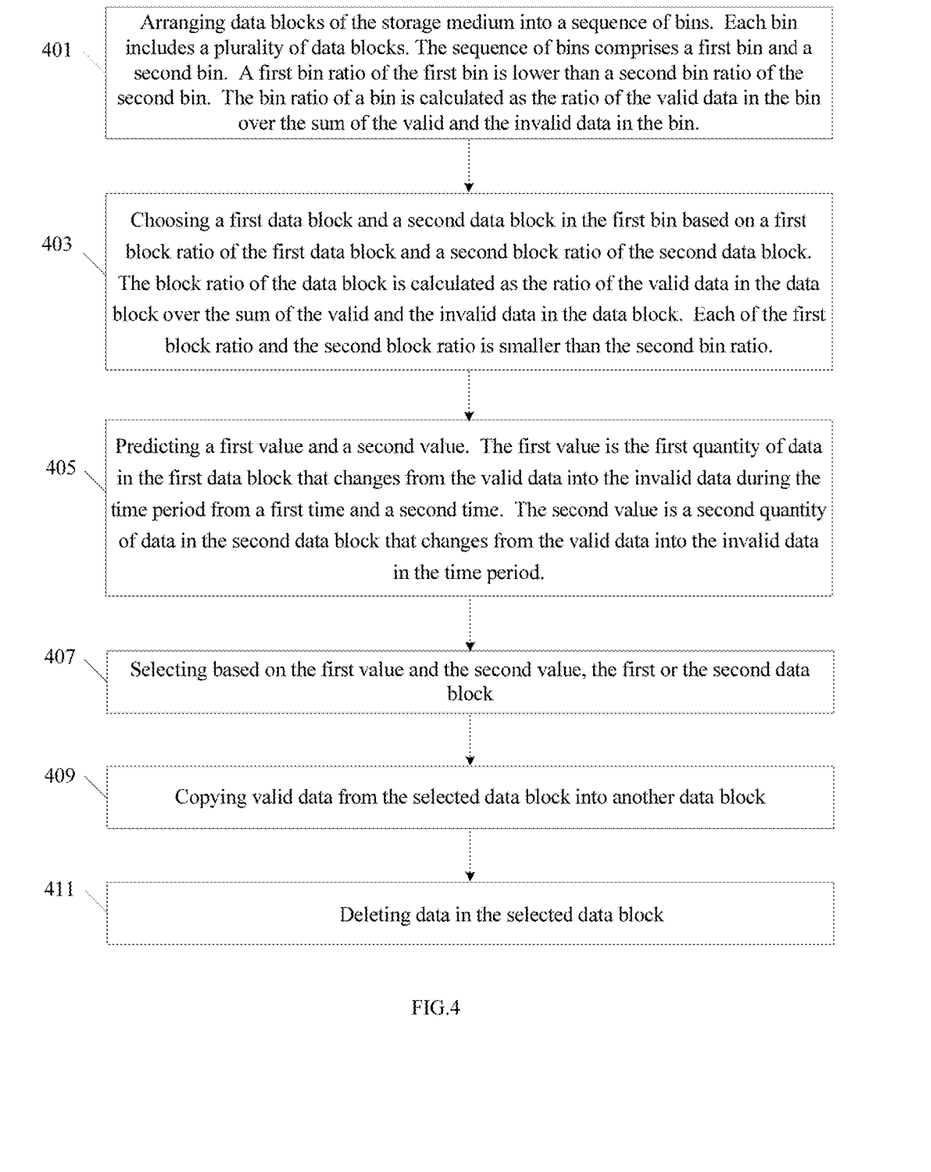
FIG. 4 is a flowchart illustrating a method for garbage collection according to an embodiment of the disclosure.

FIG. 4 is a flowchart illustrating a method for garbage collection according to an embodiment of the disclosure. The method may be implemented by the storage device 100 as illustrated in FIG. 1. The processor 130 in the storage device 100 may implement the operations in this embodiment according to computer readable instructions stored in memory 140. The instruction are stored in different modules in memory 140, such as arranging module 141, choosing module 142, selecting module 143, moving module 144 and predicting module 145.

At operation 401, the storage device 100 may arrange data blocks of a storage medium into a sequence of bins. The sequence of the bins may be the bins illustrated in FIG. 2. In some embodiments, the storage medium may be the storage medium 110 as shown in FIG. 1. In some alternative embodiments, the storage medium may be located outside the storage device 100 and have wired or wireless communicative connection with the storage device 100. In some embodiments, the sequence of the bins may be in one or more flash chips, such as flash chips 111. Each of the bins may include a plurality of data blocks. The sequence of the bins may comprise a first bin and a second bin. A first bin ratio of the first bin is lower than a second bin ratio of the second bin.

At operation 403, the storage device 100 may choose a first data block and a second data block from the first bin. These two blocks may be chosen based on a first block ratio of the first data block and a second block ratio of the second data block. Each of the first block ratio and the second block ratio may be smaller than the second bin ratio. In some embodiments, the block ratio of a data block may be the ratio of valid data in the data block over the sum of the valid data and the invalid data in the data block. In some embodiments, the first block ratio is the lowest block ratio among block ratios of all the data blocks in the first bin, and the second block ratio is the second lowest block ratio among block ratios of all the data blocks in the first bin.

At operation 405, the storage device 100 may predict a first value and a second value. The prediction is based on calculation. The first value is a first quantity of data in the first data block that changes from valid data into invalid data during a time period between a first time and a second time. The second value is a second quantity of data in the second data block that changes from valid data into invalid data in the time period. In some embodiments, in order to predict the quantity of data in a data block that change from valid data into invalid data during a time period, two elements are needed. One of the two elements is the rate of change of valid data into invalid data of the data block during the time period. The other is the length of the time period.

In some embodiments, the first value is predicted based on the size of invalid data in the first data block at the first time, the first time, the second time and a first data life time span value of the first data block at the first time. The data life time span value may be the time span between the first time and the starting time, where the starting time is the time point when the data block starts to be available to store data. The second value is predicted based on a size of invalid data in second data block at the first time, the first time, the second time and a second data life time span value of the second data block at the first time.

Figure 5:
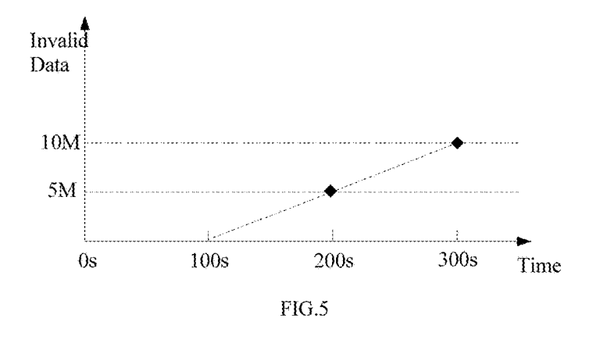
FIG. 5 is a diagram illustrating prediction of invalid data in a data block according to an embodiment of the disclosure.

FIG. 5 is a diagram illustrating prediction of invalid data in a data block according to an embodiment of the disclosure.

In this embodiment, the data block starts to be available to store data at time 100 s (starting time), and at time 200 s (first time) there are 5M invalid data in the data block illustrated in FIG. 5. The time span between time 100 s (starting time) and time 200 s (first time) may be referred as data life time span of the data block at time 200 s (first time). Based on the above information, the rate of change of valid data to invalid data may be 5M/100 s. It may be assumed that this rate may apply for the time period between 200 s (first time) and 300 s (second time). Therefore, the predicted value of data that changes from valid data to invalid data during the time period may be (5M/100 s)×(300 s−200 s)=5M.

At operation 407, the storage device 100 may select, based on the first value and the second value, the first or the second data block. In some embodiments, when the first value is smaller than the second value, the first data block may be selected as the garbage data block. In some embodiments, when the first value is larger than the second value, the second data block may be selected as the garbage data block. In some embodiments, the garbage data block may be selected between two data blocks, such as the first data block and the second data block. In some alternative embodiments, the garbage data block may be selected among three or more data blocks including the first data block and the second data block.

At operation 409, the storage device 100 may copy valid data from the selected data block into another data block. For example, when the first data block (block 11 in FIG. 2) of the first data block (block 11) and the second data block (block 12 in FIG. 2) is selected, the storage device may copy valid data in block 11 into another block, such as block 13, 1m, 23, or n2. Another block and the first data block may be in the same flash chip or different flash chips in FIG. 2.

At operation 411, the storage device 100 may delete data in the selected data block. In some embodiments, because the valid data in the selected data block is already copied into another data block, the valid data in the selected block may be deleted to make the selected block to be available to store new data. In order to get more available space, the storage device may delete all the data in the selected data block.

According to above method of some embodiments of the disclosure, the storage device selects a more stable or colder data block between or among data blocks having comparatively less valid data as the garbage data block to remove. The more stable or colder data block has lower rate or speed of changing from valid data into invalid data. Because the valid data removed to a new block are more stable or colder, the removed valid data may cause less new stale data or garbage data in the new block than some other valid data, therefore saving space of storage medium.

Figure 6:
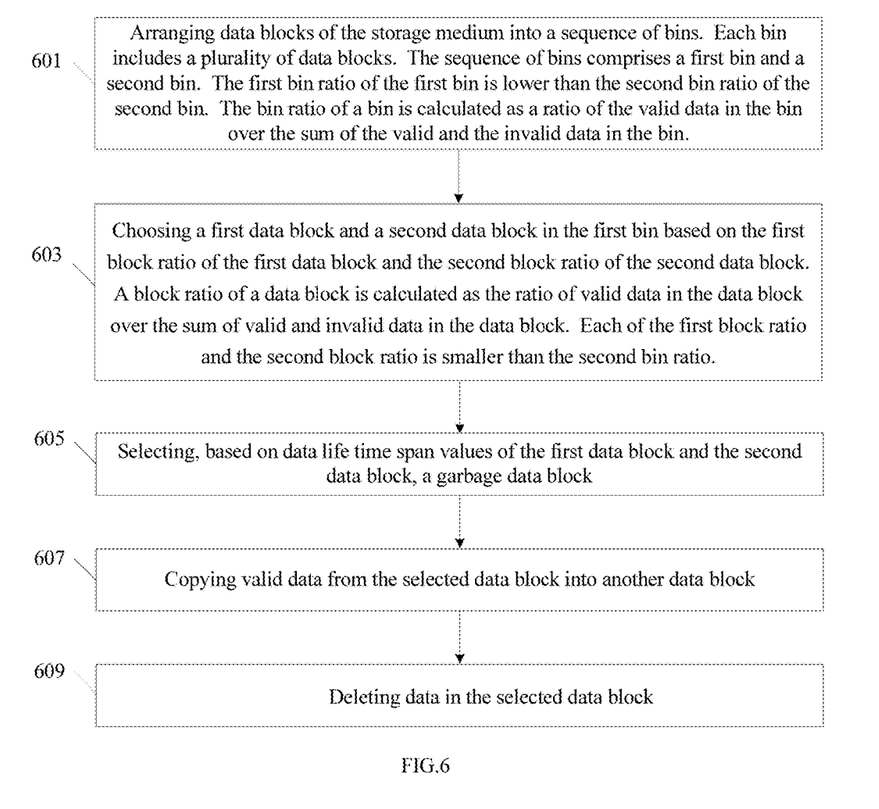
FIG. 6 is a flowchart illustrating a method for garbage collection according to an embodiment of the disclosure.

FIG. 6 is a flowchart illustrating a method for garbage collection according to an embodiment of the disclosure. The method may be implemented by the storage device 100 as illustrated in FIG. 1. The processor 130 in the storage device 100 may implement the operations in this embodiment according to computer readable instructions stored in memory 140. The instruction are stored in different modules in memory 140, such as arranging module 141, choosing module 142, selecting module 143, moving module 144 and predicting module 145.

At operation 601, a storage device 100 may arrange data blocks of the storage medium into a sequence of bins, where each bin includes a plurality of data blocks. The sequence of the bins is illustrated in FIG. 2. The sequence of bins may comprise a first bin and a second bin, where a first bin ratio of the first bin is lower than a second bin ratio of the second bin. In some embodiments, the storage medium may be the storage medium 110 as shown in FIG. 1. In alternative embodiments, the storage medium may be located outside the storage device 100 and be communicatively coupled with the storage device 100. The bin ratio of a bin is calculated as the ratio of the valid data in the bin over the sum of the valid data and the invalid data in the bin. In some embodiments, data blocks in all the bins are sorted in an ascending order based on the block ratios of all data blocks in all the bins.

At operation 603, the storage device 100 may choose a first data block and a second data block in the first bin based on a first block ratio of the first data block and a second block ratio of the second data block. Each of the first block ratio and the second block ratio may be smaller than the second bin ratio of the second bin.

In some embodiments, the first block ratio may have the lowest block ratio among the block ratios for all of the data blocks in the first bin, and the second block ratio may have the second lowest block ratio among the block ratios for all of the data blocks in the first bin. In some embodiments, the first block ratio may have the lowest block ratio among the block ratios for all of the data blocks in all the bins in the sequence; and the second block ratio may have the second lowest block ratio among the block ratios for all of the data blocks in all of the bins in the sequence. In such situations, because each of the first data block and the second data block has less valid data than other data blocks, these two data blocks may be the candidates of the garbage data block.

At operation 605, the storage device 100 may select, based on data life time span values of the first data block and the second data block, a garbage data block. In some embodiments, the storage device 100 may select the first data block as the garbage data block when the data life time span value of the first data block is more than the data life time span value of the second data block. In some embodiments, the storage device may select the second data block as the garbage data block when the data life time span value of the first data block is less than the data life time span value of the second data block.

Because each of the first block ratio and the second block ratio may be smaller than the second bin ratio, it may be considered that the first block ratio and the second block ratio are comparatively small and close to each other. Therefore, in some embodiments, the storage device 100 may select the garbage data block based on data life time span values of the first data block and the second data block without using the quantity of invalid data in the first data block and the quantity of invalid data in the second data block. The quantity of data may refer to a size of the data. For example, the unit of quantity of data may be measured in megabyte or byte.

In some embodiments, the garbage data block, may be selected between two data blocks, such as the first data block and the second data block. In some alternative embodiments, the garbage data block may be selected among three or more data blocks including the first data block and the second data block.

At operation 607, the storage device 100 may copy valid data from the selected data block into another data block. For example, when the first data block (block 11 in FIG. 2) of the first data block (block 11) and the second data block (block 12 in FIG. 2) is selected, the storage device may copy valid data in block 11 into another block, such as block 13, 1*m*, 23, or n2. Another block and the first data block may be in the same flash chip or different flash chips in FIG. 2.

At operation 609, the storage device may delete data in the selected data block. Because the valid data in the selected data block is already copied into another data block, the valid data in the selected block may be deleted to make the selected block to be available to store new data. In order to get more available space, the storage device may delete all the data in the selected data block.

According to above method of some embodiments of the disclosure, storage device selects a more stable or colder data block between or among data blocks having comparatively less valid data as the garbage data block to remove. The more stable or colder data block has lower rate or speed of changing from valid data into invalid data. Because the valid data removed to a new block are more stable or colder, the removed valid data may cause less new stale data or garbage data in the new block than some other valid data, therefore saving space of storage medium.

Figure 7:
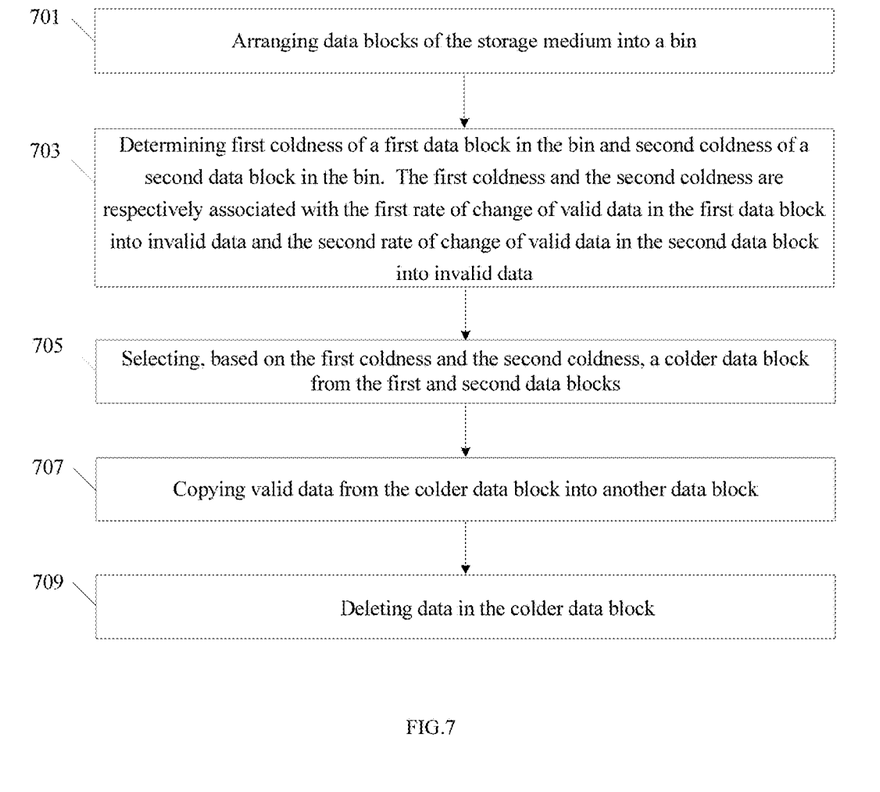
FIG. 7 is a flowchart illustrating a method for garbage collection according to an embodiment of the disclosure.

FIG. 7 is a flowchart illustrating a method for garbage collection according to an embodiment of the disclosure. The method may be implemented by the storage device 100 as illustrated in FIG. 1. The processor 130 in the storage device 100 may implement the operations in this embodiment according to computer readable instructions stored in memory 140. The instruction are stored in different modules in memory 140, such as arranging module 141, choosing module 142, selecting module 143, moving module 144 and predicting module 145.

At operation 701, the storage device 100 may arrange data blocks of a storage medium into a bin. The bin includes a plurality of data blocks. The structure and content of the bin may be the same as the structure and content of any bin as illustrated in FIG. 2. The storage device 100 may further arrange some other data blocks of the storage medium into another bin that has a plurality of data blocks. The structure and content of another bin may also be the same as the structure and content of any bin as illustrated in FIG. 2. In some embodiments, the bin and another bin may respectively be the first bin and second bin in embodiments according to FIG. 3, FIG. 4 and FIG. 6. The storage device 100 may further arrange yet other data blocks to yet other bins to get the sequence of bins as illustrated by FIG. 2. In some embodiments, the storage medium may be the storage medium 110 as shown in FIG. 1. In some alternative embodiments, the storage medium may be located outside the storage device 100 and be communicatively coupled with the storage device 100.

At operation 703, the storage device 100 may determine first coldness of a first data block in the bin and second coldness of a second data block in the bin. The first coldness is associated with a first rate of change of valid data in the first data block into invalid data. The second coldness is associated with a second rate of change of valid data in the second data block into invalid data. The rate of change of valid data in a data block into invalid data may indicate how much valid data change into invalid data in the data block per time unit. For example, when a rate of change of valid data in a data into invalid data is 3M/100 s, it may represent that 3M valid data change into invalid data in the data block per 100 s. The rate of change may also be presented as a speed of changing valid data into invalid data. The lower the rate or the speed is, the colder or more stable a data block associated with the rate or the speed is. When the first rate of change is smaller than the second rate of change, the first data block is colder than the second data block. When the first rate of change is greater than the second rate of change, the second data block is colder than the first data block.

At operation 705, the storage device 100 may select, based on the first coldness and the second coldness, a colder data block from the first and second data blocks. Selecting a colder data block may represent selecting a data block with a lower rate of change of valid data in the data block into invalid data. In some embodiments, the selection of the colder block may refer to the selection of the coldest data block based on three or more data blocks. For example, the storage device may not only determine the first and second coldness but also determine the coldness of one or more data blocks other than the first and second data blocks at operation 703. Then the storage device may select the coldest data block from the first, second and the one or more data blocks.

At operation 707, the storage device may copy the valid data from the colder data block to another data block. For example, when the first data block (block 11 in FIG. 2) of the first data block (block 11) and the second data block (block 12 in FIG. 2) is selected, the storage device may copy valid data in block 11 into another block, such as block 13, 1*m*, 23, or n2. Another block and the first data block may be in the same flash chip or different flash chips in FIG. 2.

At operation 709, the storage device may delete data in the colder data block. Because the valid data in the selected data block is already copied into another data block, the valid data in the selected block may be deleted to make the selected block to be available to store new data. In order to get more available space, the storage device may delete all the data in the selected data block.

According to above method of some embodiments of the disclosure, the storage device selects a more stable or colder data block between or among data blocks having comparatively less valid data as the garbage data block to remove. The more stable or colder data block has lower rate or speed of changing from valid data into invalid data. Because the valid data removed to a new block are more stable or colder, the removed valid data may cause less new stale data or garbage data in the new block than some other valid data, therefore saving space of storage medium.

Figure 8:
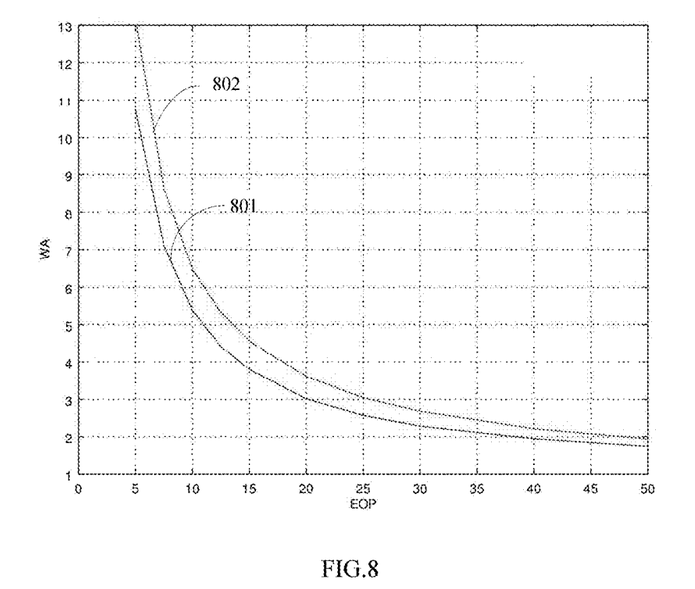
FIG. 8 is a diagram showing the comparison of write amplification (WA) over Effective Over-Provisioning (EOP) obtained by two garbage collection methods according to an embodiment of the disclosure.

FIG. 8 is a diagram showing the comparison of write amplification (WA) over Effective Over-Provisioning (EOP) obtained by two garbage collection methods according to an embodiment of the disclosure. The curve 801 represents WA values over EOP obtained by the garbage collection method in the embodiments associated with FIG. 3, FIG. 4, FIG. 6 and FIG. 7. The curve 802 represents WA values over EOP obtained by another method of garbage collection that is only based on the quantity of the valid data of a data block. The WA values represent the number of the writing actions and the EOP values represent the extra number of percentage of storage space in a storage device. As shown in FIG. 8, the curve 801 shows that EOP is 10, when WA is equal to 5, i.e., a storage medium has extra 10% of storage space over provided storage area. For example, if the normal size of a storage medium is 100M, there is additional 10M storage space provided to the storage medium to improve the performance of the storage medium, such as reducing WA. The input data for the embodiment of the disclosure and the example in the above another method is data according to standard JESD (JEDEC Standard Document) 219, where JEDEC is an abbreviation of Joint Electron Device Engineering Council. For curve 801, if EOP is 10 and WA is approximately 5, it may represent that after a storage medium with 10% EOP is full, an order of performing one writing action will actually cause about 5 times of writing actions in the storage medium. As shown in FIG. 8, the WA values of curve 801 are always lower than the WA values of curve 802. For example, when EOP is 10, WA of curve 801 is around 5, while WA of curve 802 is around 7; when EOP is 25, WA of curve 801 is around 2.5, while WA of curve 802 is around 3.

Figure 9:
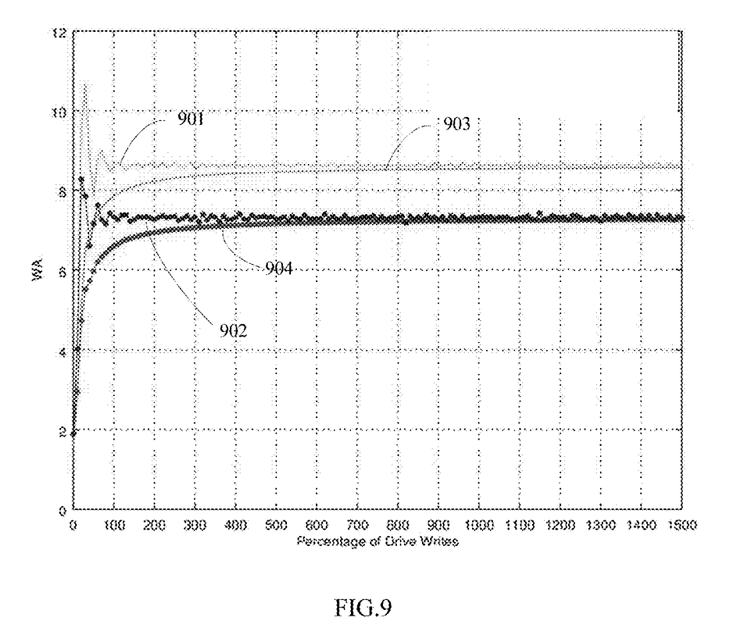
FIG. 9 is a diagram showing the comparison on write amplification at different percentage of drive writes between the data obtained by two methods according to an embodiment of the disclosure.

FIG. 9 is a diagram showing the comparison on write amplification at different percentage of drive writes between the data obtained by two methods according to an embodiment of the disclosure. The curve 901 represents instantaneous WA obtained by a method of garbage collection that is only based on the quantity of the valid data of a data block. The curve 902 represents instantaneous WA of a method of garbage collection in the embodiments associated with FIG. 3, FIG. 4, FIG. 6 and FIG. 7. The curve 903 represents overall WA of the method of garbage collection that is only based on the quantity of the valid data of the data block. The curve 904 represents overall WA of a method of garbage collection in the embodiments. As illustrated in FIG. 9, the WA of the method in the embodiments is always less than the WA of the method that is only based on the quantity of the valid data of the data block.

While several embodiments have been provided in the present disclosure, it should be understood that the disclosed methods and devices might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A storage device, comprising:
a non-transitory memory comprising instructions; and
a processor in communications with the non-transitory memory, wherein the processor is configured to execute the instructions to:
arrange data blocks of a storage medium into a sequence of bins, wherein each bin includes a plurality of data blocks, wherein the sequence of bins comprises a first bin and a second bin, wherein a first bin ratio of the first bin is lower than a second bin ratio of the second bin, and wherein a bin ratio of a bin is calculated as a ratio of valid data in the bin over the sum of valid and invalid data in the bin;
choose a first data block and a second data block in the first bin based on a first block ratio of the first data block and a second block ratio of the second data block, wherein a block ratio of a data block is calculated as a ratio of valid data in the data block over the sum of valid and invalid data in the data block, and wherein the first block ratio and the second block ratio are each smaller than the second bin ratio;
select, based on data life time span values of the first data block and the second data block without using a quanity of invalid data in the first data block and a quantity of invalid data in the second data block, a garbage data block;
copy the valid data from the garbage data block into another data block; and
delete data in the garbage data block from the storage medium.

2. The storage device of claim 1, wherein the first block ratio is the lowest block ratio among all block ratios of all data blocks in the first bin and the second block ratio is the second lowest block ratio among the all block ratios of the all data blocks in the first bin.

3. The storage device of claim 1, wherein the processor is configured to execute the instructions to:
select the first data block as the garbage data block when the data life time span value of the first data block is more than the data life time span value of the second data block; or,
select the second data block as the garbage data block when the data life time span value of the first data block is less than the data life time span value of the second data block.

4. The storage device of claim 1, wherein data blocks in all the bins are sorted in an ascending order of block ratios of all data blocks in all the bins.

5. The storage device of claim 1, wherein the selection of the garbage data block is based on three or more data blocks.

6. A method garbage collection in a storage medium, comprising:
- arranging, by a storage device, data blocks of a storage medium into a sequence of bins, wherein each bin includes a plurality of data blocks, wherein the sequence of bins comprises a first bin and a second bin, wherein a first bin ratio of the first bin is lower than a second bin ratio of the second bin, and wherein a bin ratio of a bin is calculated as a ratio of valid data in the bin over the sum of valid and invalid data in the bin;
- choosing, by the storage device, a first data block and a second data block in the first bin based on a first block ratio of the first data block and a second block ratio of the second data block, wherein a block ratio of a data block is calculated as a ratio of valid data in the data block over the sum of valid and invalid data in the data block, and wherein the first block ratio and the second block ratio are each smaller than the second bin ratio;
- selecting, by the storage device, a garbage data block based on data life time span values of the first data block and the second data block without using a quantity of invalid data in the first data block and a quantity of invalid data in the second data block;
- copying, by the storage device, the valid data from the garbage data block into another data block; and
- deleting, by the storage device, data in the garbage data block from the storage medium.

7. The method of claim 6, wherein the first block ratio is the lowest block ratio among all block ratios of all data blocks in the first bin and the second block ratio is the second lowest block ratio among the all block ratios of the all data blocks in the first bin.

8. The method of claim 6, wherein the selecting comprises:
- selecting the first data block as the garbage data block when the data life time span value of the first data block is more than the data life time span value of the second data block; or,
- selecting the second data block as the garbage data block when the data life time span value of the first data block is less than the data life time span value of the second data block.

9. The method of claim 6, wherein data blocks in all the bins are sorted in an ascending order of block ratios of all data blocks in all the bins.

10. The method of claim 6, wherein the selection of the garbage data block is based on three or more data blocks.

11. A non-transitory computer-readable media storing computer instructions, that when executed by one or more processors, cause the one or more processors to perform the steps:
- arranging data blocks of a storage medium into a sequence of bins, wherein each bin includes a plurality of data blocks, wherein the sequence of bins comprises a first bin and a second bin, wherein a first bin ratio of the first bin is lower than a second bin ratio of the second bin, and wherein a bin ratio of a bin is calculated as a ratio of valid data in the bin over the sum of valid and invalid data in the bin;
- choosing a first data block and a second data block in the first bin based on a first block ratio of the first data block and a second block ratio of the second data block, wherein a block ratio of a data block is calculated as a ratio of valid data in the data block over the sum of valid and invalid data in the data block, and wherein the first block ratio and the second block ratio are each smaller than the second bin ratio;
- selecting a garbage data block based on data life time span values of the first data block and the second data block without using a quantity of invalid data in the first data block and a quantity of invalid data in the second data block;
- copying the valid data from the garbage data block into another data block; and
- deleting data in the garbage data block from the storage medium.

12. The computer readable media of claim 11, wherein the first block ratio is the lowest block ratio among all block ratios of all data blocks in the first bin and the second block ratio is the second lowest block ratio among the all block ratios of the all data blocks in the first bin.

13. The computer readable media of claim 11, further comprising instructions:
- selecting the first data block as the garbage data block when the data life time span value of the first data block is more than the data life time span value of the second data block; or,
- selecting the second data block as the garbage data block when the data life time span value of the first data block is less than the data life time span value of the second data block.

14. The computer readable media of claim 11, wherein data blocks in all the bins are sorted in an ascending order of block ratios of all data blocks in all the bins.

15. The computer readable media of claim 11, wherein the selection of the garbage data block is based on three or more data blocks.

* * * * *